United States Patent
Liu et al.

(10) Patent No.: US 11,263,208 B2
(45) Date of Patent: Mar. 1, 2022

(54) CONTEXT-SENSITIVE CROSS-LINGUAL SEARCHES

(71) Applicant: International Business Machines Corporation, Armonk, NY (US)

(72) Inventors: Su Liu, Austin, TX (US); Li Li, Cedar Park, TX (US); Zhichao Li, Austin, TX (US); Ben Gibbs, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 16/292,860

(22) Filed: Mar. 5, 2019

(65) Prior Publication Data
US 2020/0285636 A1    Sep. 10, 2020

(51) Int. Cl.
| | |
|---|---|
| *G06F 16/242* | (2019.01) |
| *G06F 16/22* | (2019.01) |
| *G06F 16/248* | (2019.01) |
| *G06F 16/9535* | (2019.01) |
| *G06F 17/27* | (2006.01) |
| *G06F 40/30* | (2020.01) |
| *G06F 40/263* | (2020.01) |

(52) U.S. Cl.
CPC ........ *G06F 16/243* (2019.01); *G06F 16/2228* (2019.01); *G06F 16/248* (2019.01); *G06F 16/9535* (2019.01); *G06F 40/263* (2020.01); *G06F 40/30* (2020.01)

(58) Field of Classification Search
CPC .............. G06F 16/243; G06F 16/2228; G06F 16/9535; G06F 16/248; G06F 40/263; G06F 40/30

USPC ......................................................... 707/706
See application file for complete search history.

(56) References Cited

U.S. PATENT DOCUMENTS

| | | |
|---|---|---|
| 9,477,656 B1 | 10/2016 | Dean |
| 2006/0277189 A1* | 12/2006 | Cencini ................. G06F 16/951 |
| 2012/0158621 A1 | 6/2012 | Bennett et al. |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Usmaan Saeed
*Assistant Examiner* — Earl Elias
(74) *Attorney, Agent, or Firm* — Heslin Rothenberg Farley & Mesiti P.C.; Edward Wixted, Esq.

(57) ABSTRACT

A method, computer program product, and system for providing cross-lingual search results that retain cultural context include a processor(s) monitoring (with user permission) computing activities performed by the user, via a client. The processor(s) analyzes the computing activities to identify data comprising elements relevant to the user and relationships between the elements and the user. The processor(s) generates a data structure comprising the data. The processor(s) generates a search interface for obtaining entries in a first language to perform a query; the entries are search parameters embedded with a portion of the elements. The processor(s) obtains an entry in the first language. The processor(s) extracts the portion of the elements from the entry (cultural context for the entry). The processor(s) determines target languages for data responsive to the query. The processor(s) translates the search parameters and the cultural context into the target languages and executes searches on databases.

18 Claims, 9 Drawing Sheets

(56) References Cited

U.S. PATENT DOCUMENTS

| | | |
|---|---|---|
| 2013/0338996 A1 | 12/2013 | Katragadda et al. |
| 2016/0321361 A1 | 11/2016 | Caskey et al. |
| 2019/0197115 A1* | 6/2019 | Carter .................. G06F 16/243 |
| 2020/0142890 A1* | 5/2020 | Zhang ............... G06F 16/24578 |

* cited by examiner

CONTEXT-SENSITIVE CROSS-LINGUAL SEARCHES

BACKGROUND

Users utilize search engines to ask a variety of questions. Many of these search engines are more useful to users when they provide a user with targeted results. For example, if a user asks, "What is the weather?" and receives results that are relevant to the geographic location of the user, without having to enter the geographic location as a parameter of the search, the result is more useful to the user. If the response did not include weather data relevant to the location of the user, the result would be less useful. The additional intelligence in the search that is not manually entered as a parameter of the search is contextual data (that can be collected through a user's browsing history, cookies, and other monitoring tools). Thus, when a user initiates what appears to be a generic search, the results can be tailored by the search engine to the user.

In order to add context to searches, existing search engines and interfaces include various mechanisms. For example, some conventional information retrieval engines include some built-in algorithms for processing users' search queries. These built-in algorithms can limit user information for personalized service. One such commonly utilized mechanism is an autocomplete feature. As experienced by many users of conventional search engines and interfaces (e.g., web browsers, text editors, messaging applications, etc.), the autocomplete mechanism enables users to fill out commonly-entered information into a text fields (e.g., typed user name, e-mail address, etc.). For example, based on the suggested autocompleted text, the user could narrow the search criteria entered, from "school closings" to "school closings in Albany, N.Y." The additional context enables the search engine to provide more targeted results.

Another area in which search functionality is aided by contextual data is when a word included in a search could potentially have various meanings. In this case, an efficient and effective search would provide results that are sensitive to the context in which the word was used by the user (i.e., the word usage). For example, if a user includes the word "apple" in entered search parameters, the search engine can provide more targeted results if this word is understood as a technological reference or a fruit. Word usage problems abound in electronic searching when language barriers are introduced. When a word is translated, all context surrounding the word can be lost, eliminating the ability to properly target search results to a user.

SUMMARY

Shortcomings of the prior art are overcome and additional advantages are provided through the provision of a method for providing targeted results to cross-lingual searches. The method includes, for instance: monitoring, by one or more processors, computing activities performed by a user, via a client, based on the client connecting, over a network, to one or more applications; analyzing, by the one or more processors, the computing activities performed by the user, in the one or more applications, to identify data comprising elements relevant to the user and relationships between the elements and the user; generating, by the one or more processors, based on the analyzing, a data structure, wherein the data structure comprises the data; generating, by the one or more processors, based identifying the elements in the data structure, a search interface for obtaining entries via the client in a first language, wherein the first language comprises a native language of the user, to perform a query, wherein the entries comprise search parameters defining the query, and wherein the search parameters defining the query are embedded with a portion of the elements; obtaining, via the search interface, an entry in the first language, the entry comprising search parameters embedded with the portion of the elements; extracting, by the one or more processors, the portion of the elements from the entry, wherein the portion of the elements comprise a cultural context for the entry; determining, by the one or more processors, based on extracting, from the entry, the portion of the elements, one or more target languages for data responsive to the query, wherein the one or more target languages are not the first language; translating, by the one or more processors, the search parameters and the cultural context into the one or more target languages; and executing, by the one or more processors, one or more searches on one or more databases, wherein the one or more searches comprises the translated search parameters and the translated cultural context.

Shortcomings of the prior art are overcome and additional advantages are provided through the provision of a computer program product for providing targeted results to cross-lingual searches. The computer program product comprises a storage medium readable by a processing circuit and storing instructions for execution by the processing circuit for performing a method. The method includes, for instance: monitoring, by the one or more processors, computing activities performed by a user, via a client, based on the client connecting, over a network, to one or more applications; analyzing, by the one or more processors, the computing activities performed by the user, in the one or more applications, to identify data comprising elements relevant to the user and relationships between the elements and the user; generating, by the one or more processors, based on the analyzing, a data structure, wherein the data structure comprises the data; generating, by the one or more processors, based identifying the elements in the data structure, a search interface for obtaining entries via the client in a first language, wherein the first language comprises a native language of the user, to perform a query, wherein the entries comprise search parameters defining the query, and wherein the search parameters defining the query are embedded with a portion of the elements; obtaining, via the search interface, an entry in the first language, the entry comprising search parameters embedded with the portion of the elements; extracting, by the one or more processors, the portion of the elements from the entry, wherein the portion of the elements comprise a cultural context for the entry; determining, by the one or more processors, based on extracting, from the entry, the portion of the elements, one or more target languages for data responsive to the query, wherein the one or more target languages are not the first language; translating, by the one or more processors, the search parameters and the cultural context into the one or more target languages; and executing, by the one or more processors, one or more searches on one or more databases, wherein the one or more searches comprises the translated search parameters and the translated cultural context.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
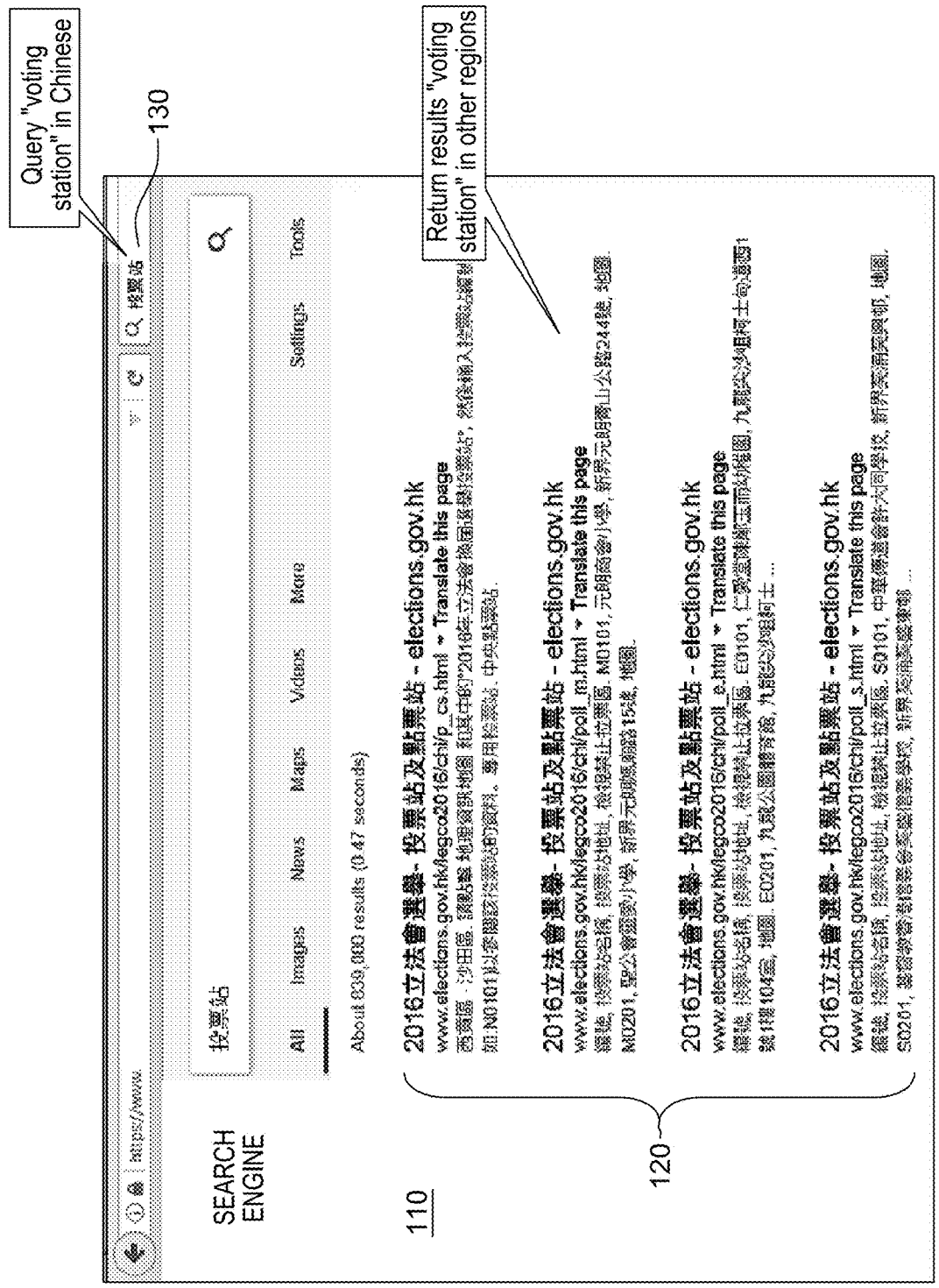
FIG. 1 is an illustration of existing search functionality without the implementation of aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
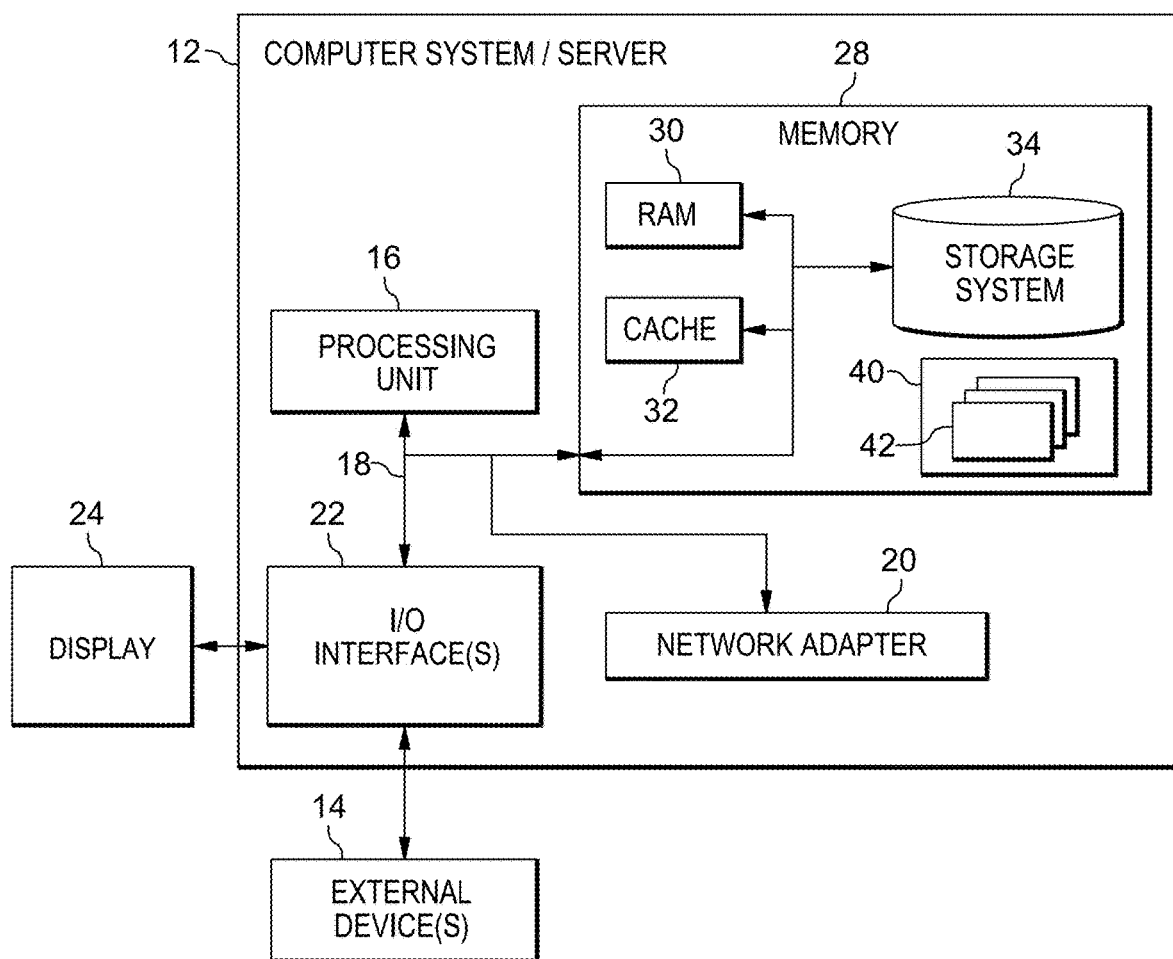
FIG. 7 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

Despite the ongoing enhancements and optimization of search engines, existing search methods and engines lack cultural awareness when searching across different languages and this shortcoming adversely affects the ability of the search engine to provide correct, targeted, results to swaths of users. Presently, when a user attempts to conduct a search in a language that is not native to the user, the user utilizes a translation software to translate the user search criteria into the language in which the results would likely be provided. For example, a non-native English speaker seeking the location of a restaurant in New York City may translate the search criteria into English before populating a form field with the search criteria. Unfortunately, when the translated entry is provided, it does not offer any context to the search engine and therefore, the search results will not be contextually accurate for the user. Existing search engines and interfaces do not pass and combine cultural contextual data with search querying strings because no mechanism in these engines obtains cultural context as there are no cultural awareness information channels. Merely translating terms does not imbue the terms with cultural context and thus, even a search engine with an integrated cross-language platform and machine translation cannot provide this context. As opposed to existing search platforms, embodiments of the present invention enable cross-language searching with cultural context, providing users with contextually accurate and targeted search results.

Embodiments of the present invention include a computer-implemented method, a computer program product, and a computing system, where program code executing on one or more processors provide contextually sensitive search results to a query regardless of language differences between the query and the resources searched to obtain the results, and the program code provides these results in one or more languages that are understood by the user. Program code in embodiments of the present invention machine learns both attributes related to the user and attributes related to the location of the user (e.g., culture, geo-location) to execute a search, automatically, with these contextual elements, regardless of the language of the resources searched, to provide the results. The program code provides the contextually-sensitive results in a language that the user can comprehend. Some embodiments of the present invention execute contextually sensitive searches and provide contextually sensitive search results by including program code that provides the following functionality: 1) generating a data structure by obtaining data related to context of a culture of a user as well as related to a user (e.g., user culture, native language, current geo-location, targeted languages, targeted geo-locations, etc.); 2) embedding a query provided by the user with the contextual cultural information (reflecting cultural awareness of the user); 3) providing an interface with which to obtain the embedded query; 4) obtaining the embedded search query; 5) translating the embedded query into one or more targeted languages; 5) executing the embedded query on resources based on the targeted geo-locations; 6) translating results from the query execution into one or more native languages of the user utilizing the data structure; and 7) providing one or more of the results and/or the translated search request back to the user. In some embodiments of the present invention, the program code (machine) learns the cultural context of the user in order to utilize elements of the context in crafting, translating, and executing a search. Attributes of the user that program code machine learns, with the permission of the user, can include, but are not limited to: native language(s), locale, current geo-location, interested geo-locations, predicted searching purpose, applications utilized by the user. The program code can further enhance these attributes, which provide context for searches, based on tracking the user searching contexts utilized by the user (with the permission of the user) and receiving feedback based on search results provided.

Aspects of various embodiments of the present invention are inextricably tied to computing and provide significant advantages over existing search systems. First, aspects of various embodiments of the present invention are inextricably tied to computing at least because these aspects can be implemented as enhancements to a search engine, and can provide enhanced search results to queries. The program code provides these targeted search results, in part, by generating and maintaining data structures that include knowledge bases for various users, as well as relationships between known entities in the knowledge bases. The program code obtains data for the data structures (and generates the data structures) based on taking advantage of the interconnectivity of various computing systems, including Internet of Things (IoT) devices and personalized computing devices (e.g., the digital wardrobe of the user). Thus, aspects of embodiments of the invention are inextricably tied to computing at least because they represent enhancements to a system that is native to computing and exploit a computing infrastructure or generate an original computing interface to provide this enhancement.

Aspects of various embodiments of the present invention present advantages over existing search systems and systems that provide search results responsive to user queries. For example, in embodiments of the present invention, program code executing on one or more processors incorporates attributes of user's cultural contextual information into web-based searches to enable non-native speakers of a language utilizing a search feature targeted to people native in the language to find relevant information. Additionally, in contrast to existing search systems and engines and application programming interfaces (APIs) that provide search criteria to these systems and engines, embodiments of the present invention include program code that translates both a search query as well as the context of the search query into multiple targeted languages in order to search in targeted regions. The program code can return search results to the user by translating the search results obtained in the targeted languages into the user's native language. As will be discussed further, in order to provide these significant benefits over existing approaches to searching, the program code identifies a user's cultural context (e.g., user culture, native language, current geo-location, targeted languages, etc.) from a received search query and/or contemporaneous with receiving the search query, and translates the search query into multiple targeted languages for searching with targeted geo-locations to return contextually-sensitive search results in a user's native language.

To appreciate the benefits provided by embodiments of the present invention beyond existing systems, FIG. 1 is an illustration 100 of some difficulties faced by a non-native English speaker attempting to run a search in an existing search. As understood by one of skill in the art, the English language is utilized as an example and does not suggest a limitation in the functionality. However, providing specific languages in the example enables a detailed illustration of issues in current approaches and highlights how these approaches are improved by the integration of aspects of some embodiments of the present invention into computerized search systems and approaches. In FIG. 1, a native speaker of the Chinese language is utilizing an interface 110 in order to obtain search results 120 that are relevant to a local geographic area in the United States, in which English is the predominant language. The targeted results sought by the user would be local to the geo-location of the user. Specifically, in FIG. 1, the Chinese-speaking user is seeking his or her local polling station for an election for public office in the United States. If the user were entering the query "voting station" in the search bar 130 in English, the results would automatically be targeted to the geo-location of the user. However, because, as demonstrated in FIG. 1, the user enters the search query in a search bar 130 in Chinese, the search engine searches resources in that native language, rather than local to the user. Thus, the user receives results 120 that are not useful because the context (i.e., the geo-location of the user) is missing. Rather than receiving search results that include polling places local to the user, the search results provide links to election information in Hong Kong, which is not relevant to the user.

Figure 2:
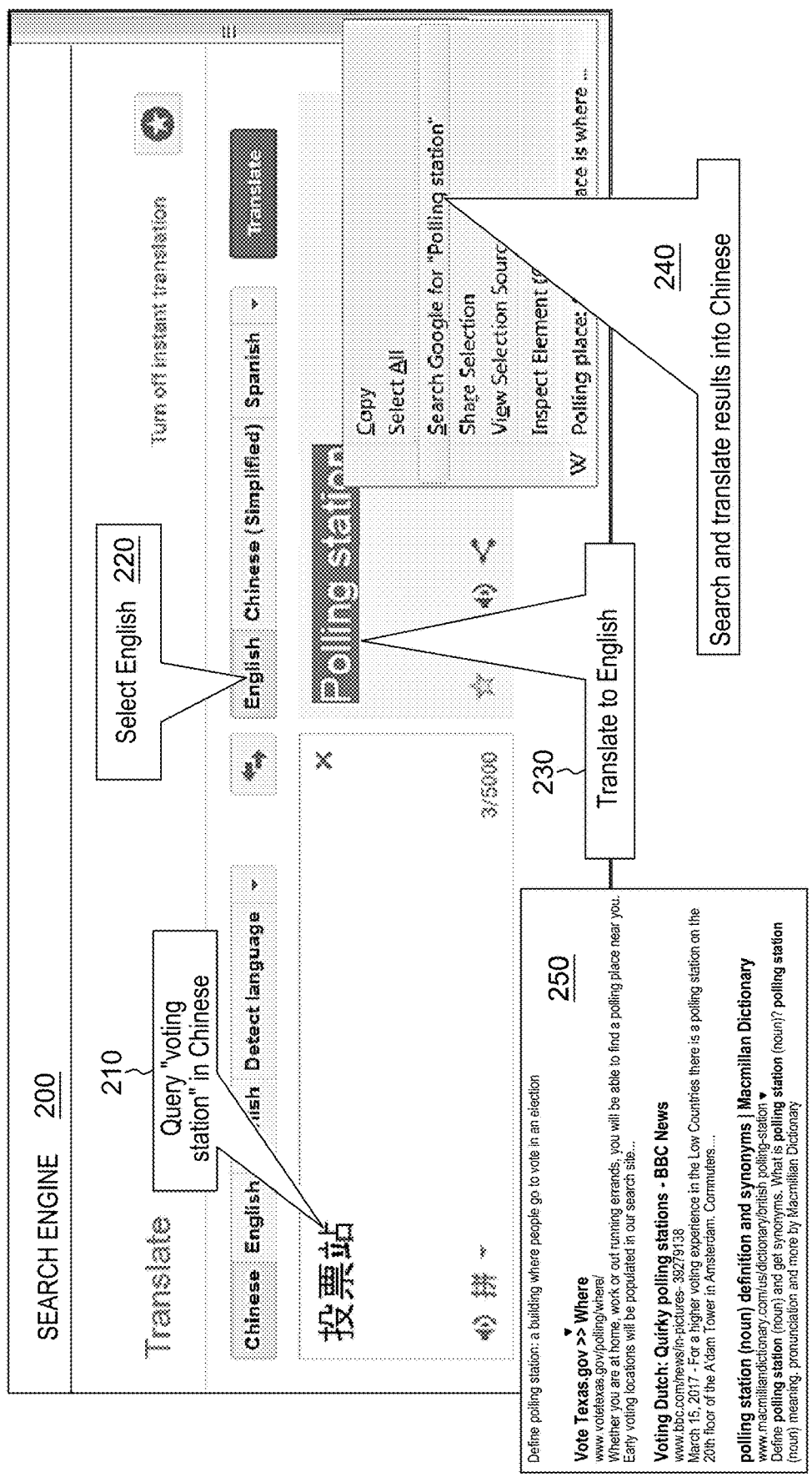
FIG. 2 is an illustration of existing search functionality without the implementation of aspects of some embodiments of the present invention.

FIG. 2 is a further illustration 200 of some of the challenges when searching across languages utilizing existing approaches. Following from the challenges depicted in FIG. 1, FIG. 2 illustrates how a Chinese-speaking user would attain results similar to an English-speaking user. As discussed above, and demonstrated in in FIG. 1, a Chinese-speaking user executing the same search as an English-speaking user, when both users share a similar cultural context, would receive different results than the English-speaking user because the context would effectively be lost in translation. Thus, FIG. 2 illustrates a user-intensive workaround that this Chinese-speaking user must perform in the hopes of receiving the same correctly targeted search results as the English-speaking user (when both users share a similar cultural context). As illustrated in FIG. 2, in order to obtain similar search results to the English-speaking user, the Chinese-speaking user performs extra steps to enable the search engine 200 to perform the search with cultural context. Specifically, the Chinese-speaking user invokes the query by entering the search terms (210), selects a language into which to translate the search criteria (220), translates the search term from Chinese to English (230), and then translates the search results 250 into Chinese (240). These are all manual steps that must be performed by the user. Additionally, in prior approaches, there is no method to intelligently tell when, where, and how to connect the translations and preserve the context and at any point in this process, the context can be dropped. For example, the context in which an English-speaking user executes a query could dictate the particular usage of a word, but a non-native speaker who attempts to search a translation could be accidentally searching on a homonym or alternate usage of the desired term, rather than the desired term.

Figure 3:
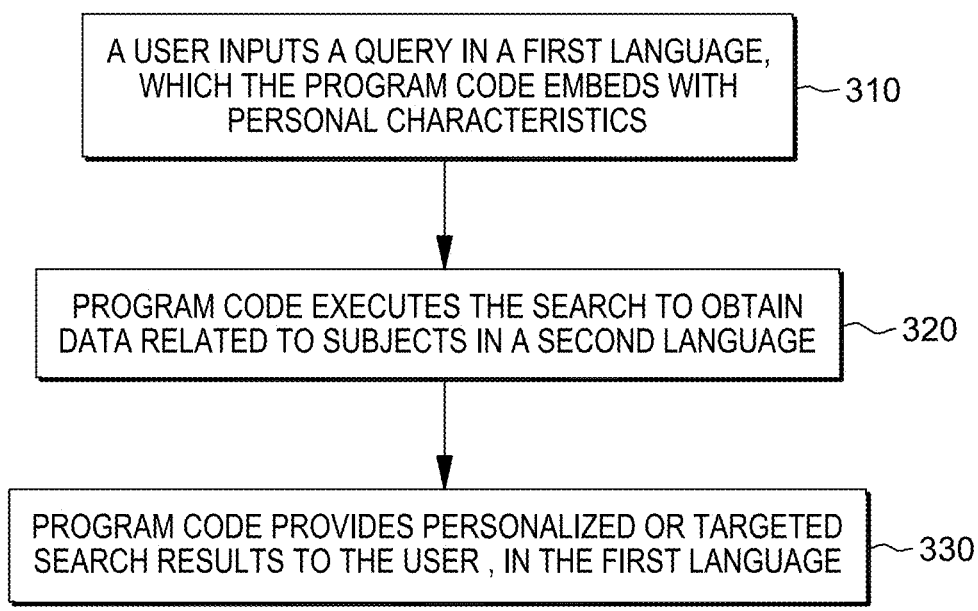
FIG. 3 is a workflow illustrating certain aspects of an embodiment of the present invention.

FIG. 3 is a high level workflow 300 that illustrates various aspects of some embodiments of the present invention. Various aspects can be practiced by program code executed by nodes in a shared and/or distributed computing system, including but not limited to, a cloud computing system. As discussed above, in some embodiments of the present invention, the program code integrates culture and geo-location awareness into searches to enable non-native speakers of a given language to find useful information. On a very high level, as demonstrated in more detail in FIG. 3, by utilizing aspects of some embodiments of the present invention, a user inputs a query in a first language, which the program code embeds with personal characteristics (310). These personal characteristics comprise a cultural context and can include, but are not limited to, the native language(s) of the user, the locale of the user, the current geo-location of the user, the geo-location(s) of interest to the user, a predicted searching purpose of the user, active and/or running applications of the user. The program code executes the search to obtain data related to subjects in a second language (320). The program code provides personalized or targeted search results to the user, in the first language (330). In this high level example. The user is a native speaker of the first language but not of the second language.

Figure 4:
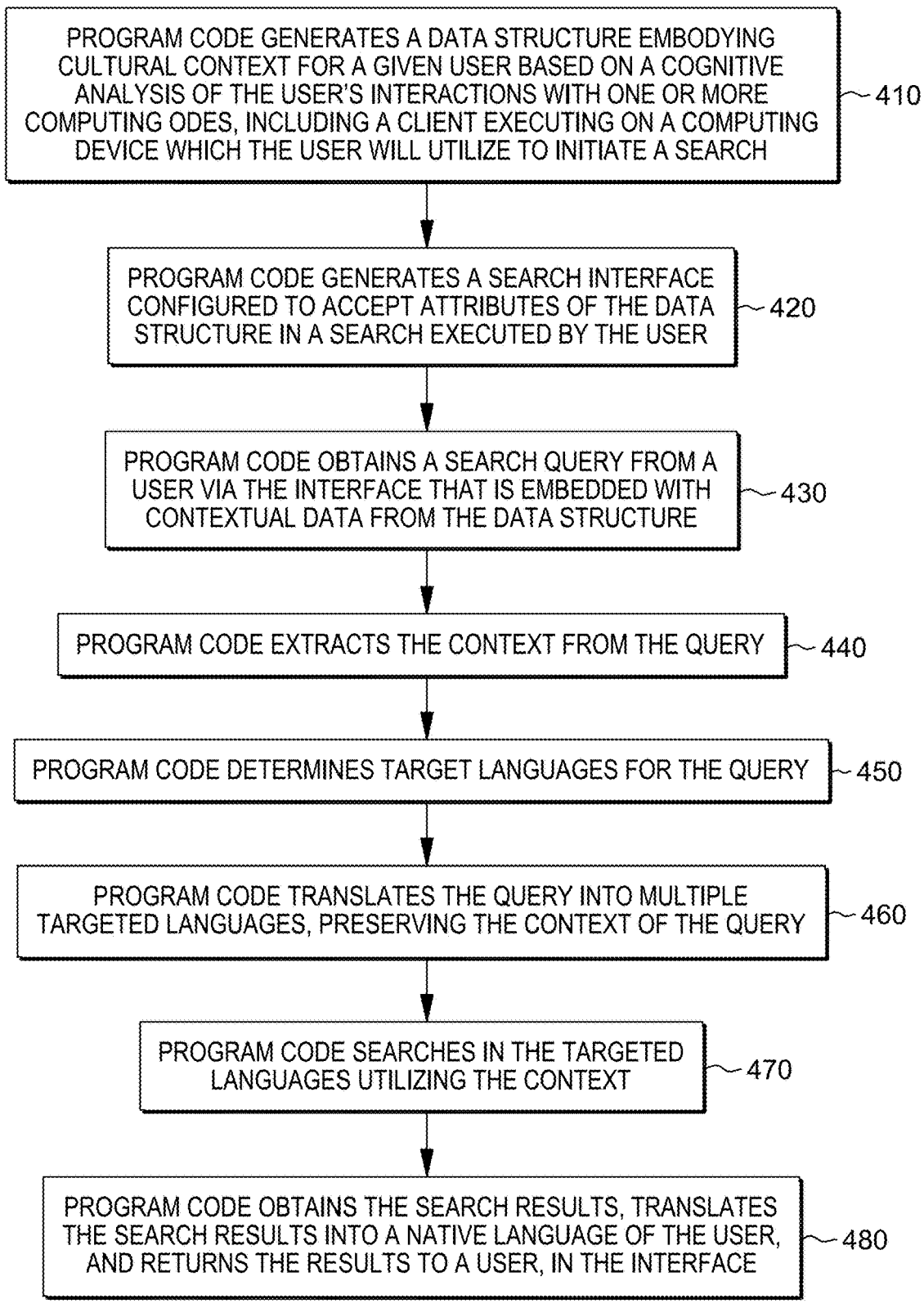
FIG. 4 is an illustration of various aspects of an embodiment of the present invention.

FIG. 4 provides a more detailed workflow 400 of various aspects of some embodiments of the present invention, in an embodiment of the present invention, the program code generates a data structure embodying cultural context for a given user based on a cognitive analysis of the user's interactions with one or more computing nodes, including a client executing on a computing device which the user will utilize to initiate a search (410). In some embodiments of the present invention, the program code stores various settings in a user profile. The settings in the user profile may include, but are not limited to enabled or disabled settings for various services that monitor a user to obtain data, personal information, native languages, locales, etc. The data structure can be stored locally on the computing device and/or on a centralized one or more servers, together with data structures relevant to other users. In embodiments of the present invention, the data structure comprises queried information and data providing cultural context and/or an awareness of cultural context for the user. The timing of the program code generating this data structure can vary as it can be generated by the program code contemporaneously with the program code executing a search and/or maintained by the program code on a computing device accessible to the one or more processors executing the program code. In some embodiments of the present invention, the data structure includes, but is not limited to, a user tag, a native language tag, a location tag, and/or searching context information.

In order to generate the data structure, the program code requests and obtains permission from the user both to access data utilized by the program code in generating the data structure and to monitor user activity utilized to generate the data structure. The data structure comprises cultural context information relevant to the user. The program code, with the permission of the user, can monitor computing activities of the user to determine aspects of the user's culture: native language, current geo-location, and/or any searching context information. For example, the program code can utilize, with the permission of the user, location services within the client to determine a location of a user and can recognize languages familiar to the user based on language settings on applications utilized by the user on the computing device executing the search client as well as other computing devices communicatively coupled to the one or more processors executing the program code, and/or input languages in various applications and interfaces utilized by the user on these computing devices.

Based on the connectivity of multiple systems and the prevalence of Internet of Things (IoT) devices and other personal computing devices, the data structure that the program code can generate for a given user can be more extensive than the data available through monitoring usage of applications on the computing device utilized to execute the search client. For example, in some embodiments of the present invention, the program code can generate and continually update a data structure associated with a given user based on that user's digital wardrobe. In some embodiments of the present invention, the data structure can include various elements of a digital wardrobe of a given user or group or users that the program code can (cognitively) analyze when establishing the data structure. As understood by one of skill in the art, a digital wardrobe is a collection of data that can be understood as a unique identifier for a user. A user's digital wardrobe is comprised of all hardware and software that a user interacts with. For example, not only is a user's digital wardrobe comprised of all physical computing devices a user may utilize (e.g., personal computing device, IoT devices, sensors, personal health trackers, physical activity trackers, smart watches, digital thermostat, smart televisions, digital cameras, computerized exercise equipment, smart appliances, etc.), it is also comprised of any software a user utilizes (e.g., social media platforms, ecommerce applications, electronic media subscriptions, electronic media views, etc.). Because of the variety of devices and applications available, those of skill in the art accept that two individuals will not have the same digital wardrobe. Thus, an individual's digital wardrobe can be utilized as a unique identifier for the individual, which can aid the program code in providing contextualized results that are not only personalized, but, possibly, unique to the user. In addition to identifying a user, data that comprises a digital wardrobe can be utilized to tailor additional applications, software, events, experiences, to fit the parameters and preferences to the user, based on extracting and analyzing this data from the user's digital wardrobe. In embodiments of the present invention, the program code can extract elements of a user's digital wardrobe to generate a data structure that the program code utilizes to generate a data structure to embed with queries to provide customized (contextual) search results to the user.

Elements of a digital wardrobe for a given user can be accessed by one or more servers executing the program code of embodiments of the present invention, via a personal computing device utilized by the user to execute a query via communications of the personal computing device with IoT devices. As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, location, temperature, and humidity. The smart sensors can be utilized to measure temperature, humidity, vibrations, motion, light, pressure and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. Because the smart sensors in IoT devices carry unique identifiers, a computing system that communicates with a given sensor (e.g., a personal computing device utilized by a user to execute a query) can identify the source of the information. Within the IoT, various devices can communicate with each other and can access data from sources available over various communication networks, including the Internet. Thus, based on communicating with the personal computing device of a user, program code executing on one or more servers can obtain digital wardrobe data from the personal computing device, to generate and update the data structure and therefore, to generate the data structure utilized to provide data to configure the contextual searches.

In some embodiments of the present invention, the program code utilizes a neural network to analyze user data and generate the data structures. Neural networks are a biologically-inspired programming paradigm which enable a computer to learn from observational data, in this case, data relevant to a user, including the digital wardrobe of a user and user profile data. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns and attributes in data. Because of the speed and efficiency of neural networks, especially when parsing multiple complex data sets, neural networks and deep learning provide solutions to ingesting and organizing data from diverse sources. In fact, neural networks can be used to solve many problems in speech recognition and natural language processing, which are relevant to embodiments of the present invention when determining languages with which a user is familiar and providing results to a user in languages in which the user is fluent.

Some embodiments of the present invention may utilize a neural network to predict additional attributes of a user, for inclusion in the data structure, based on the inputs provided. Utilizing the neural network, the program code can predict subsequent data. The program code obtains (or derives) the initial attributes from user profile, or a digital wardrobe, to generate an array of values (possible attributes) to input into input neurons of the neural network. Responsive to these inputs, the output neurons of the neural network produce an array that includes the identified attributes as well as the predicted attributes. The neural network can also be utilized to process the data of multiple users simultaneously, and in processing these data, the program code can generate and predict relationships between users for utilization in the data structures.

In some embodiments of the present invention, a neuromorphic processor or trained neuromorphic chip can be incorporated into the computing resources executing the program code. One example of a trained neuromorphic chip that can be utilized in an embodiment of the present invention is the IBM® TrueNorth chip, produced by International Business Machines Corporation. IBM® is a registered trademark of International Business Machines Corporation, Armonk, N.Y., U.S.A.

Returning, the FIG. 4, in some embodiments of the present invention, the program code interacts with a cognitive agent in order to perform the cognitive analysis to generate the data structure (410). In some embodiments of the present invention, program code executing on one or more processors utilizes aspects, including Application Program Interfaces (APIs), of an existing cognitive analysis tools to analyze perform the cognitive analysis of the user's interactions with one or more computing nodes, including the computing device providing the search client. Some embodiments of the present invention utilize IBM Watson® as a cognitive agent to perform the described analysis. IBM Watson® is a product of International Business Machines Corporation. IBM Watson® is a registered trademark of International Business Machines Corporation, Armonk, N.Y., US. In embodiments of the present invention, the program code interfaces with IBM Watson® APIs to perform analyses, with the permission of the user, of a user's computing activities. APIs of IBM Watson® that can be utilized in various embodiments of the present invention to perform the described analysis to generate the data structure, but the analysis can utilize, but is not limited to, natural language classifiers, Retrieve and Rank (i.e., a service available through the IBM Watson® Developer Cloud that can surface the most relevant information from a collection of documents), Tone Analyzer, concepts/visual insights, trade off analytics, document conversion, relationship extraction, natural language processing, text to speech capabilities, and/or translation.

Program code in embodiments of the present invention can utilize a cognitive agent to analyze the cultural context of the user in order to generate a data structure representing the cultural context. IBM Watson® is an example of the type of cognitive agent that can be employed in embodiments of the present invention. However, various existing cognitive agents can also be utilized in embodiments of the present invention. IBM Watson® is a non-limiting example of a cognitive agent that can be utilized in some embodiments of the present invention and is discussed for illustrative purposes, only, and not to imply, implicitly or explicitly, any limitations regarding cognitive agents that can comprise aspects of embodiments of the present invention. In some embodiments of the present invention that utilize IBM Watson® as a cognitive agent, the program code interfaces with IBM Watson® APIs to perform a cognitive analysis of data obtained from various computing devices and applications utilized by a user (e.g., the digital wardrobe of the user, IoT devices proximate to the user, browsing activity of the user, etc.) including, for example, data related to the environment of the user. Although not all embodiments of the present invention utilize an existing cognitive agent, utilizing an existing cognitive agent, such as IBM Watson®, or similar cognitive agents with APIs that can process various types of data, and thus, can expand the type of data that the program code can access to determine the cultural context of the user. For example, in an embodiment of the present invention, one or more programs analyze the data obtained by the program code utilizing one or more of a natural language classifier, retrieve and rank APIs, and trade off analytics APIs. The IBM Watson® API can also provide audio related API services, in the event that the data includes audio (which is often part of environmental context data), which can be utilized by the program code, including but not limited to speech recognition, natural language processing, text to speech capabilities, and/or translation. Various other APIs and third party solutions outside of IBM Watson® can also provide this functionality in embodiments of the present invention.

Returning to FIG. 4, in embodiments of the present invention the program code generates a search interface configured to accept attributes of the data structure in a search executed by the user (420). The program code obtains a search query from a user via the interface that is embedded with contextual data from the data structure (430). The program code extracts the context from the query (440). As part of extracting the contextual data, the program code determined the language of entry of the query. The cultural context can include, but is not limited to user culture, native language, current geo-location, targeted languages, targeted geo-locations, etc. Based on the query (and the targeted languages embedded in the context, if available), the program code determines target languages for the query (450). Returning to the example in FIGS. 1-2, as seen in the prior art, a user translated a query and tried to capture some context before searching. In contrast, in embodiments of the present invention include the context in the search regardless of what language the search is being searched and in what language the search is being executed, the context follows to query.

Returning to FIG. 4, based on determining the target languages for the search (which can be accomplished through the use of a cognitive agent and/or by identifying target languages in the context), the program code translates the query into multiple targeted languages, preserving the context of the query (460). In an embodiments of the present invention, the program code searches in the targeted languages utilizing the context, including but not limited to a targeted geo-location (470). The program code obtains the search results, translates the search results into a native language of the user, and returns the results to a user, in the interface (480).

Figure 5:
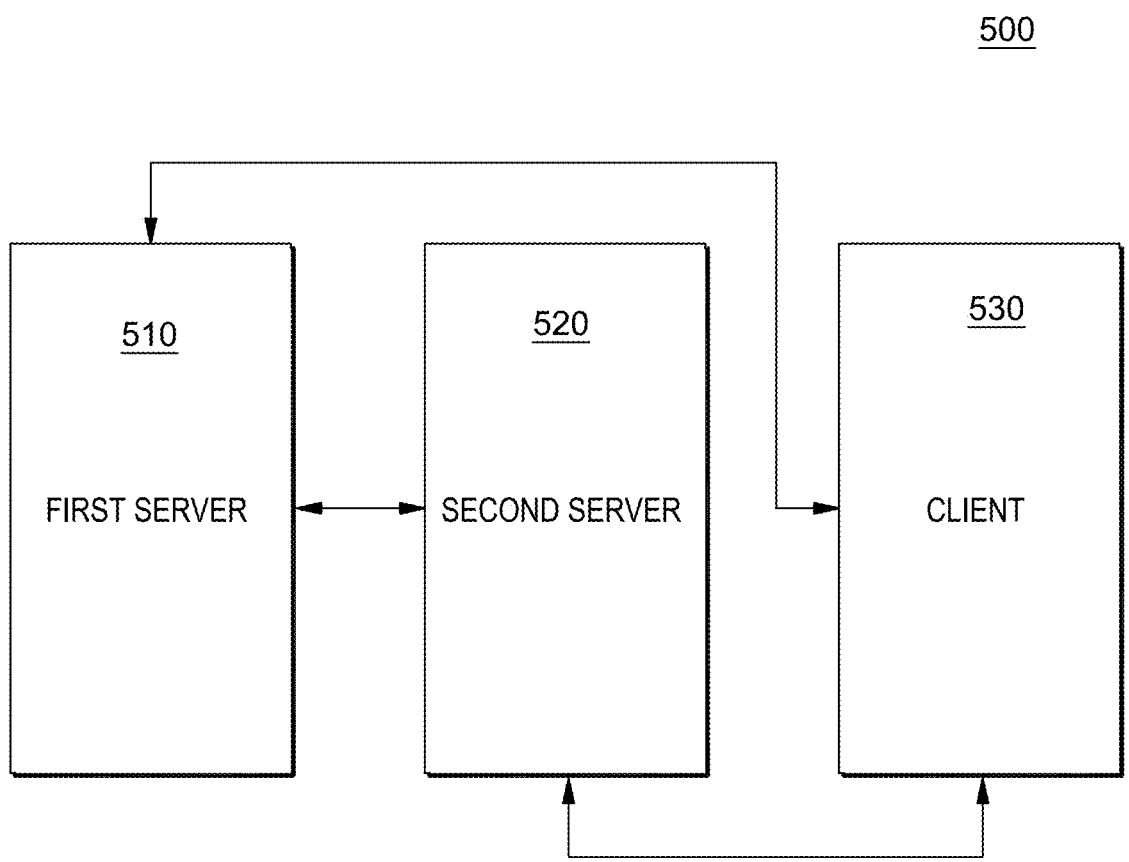
FIG. 5 is an overview of a general technical architecture into which various aspects of some embodiments of the present invention can be implemented.

FIG. 5 is a technical architecture 500 in which various computing nodes practice various aspects of some embodiments of the present invention. This separation of functionality is utilized for illustrative purposes only and as understood by one of skill in the art, various aspects can be combined in different ways and implemented across various computing nodes. However, in this illustrative example, aspects of some embodiments of the present invention are implemented in a first server 510, which generates and stores the data structure, a second server 520, which executes the search, and a client 530, which provides an interface for entering query terms to trigger the search on the second server 520.

In some embodiments of the present invention, program code executing on the first server 510 generates a data structure embodying cultural context for a given user based on a cognitive analysis of the user's interactions with one or more computing nodes, including a client executing on a computing device which the user will utilize to initiate a search (e.g., FIG. 4, 410). In some embodiments of the present invention, the monitoring (with user permission) discussed above which enables the generation of the data structure is continuous and asynchronous with the execution of searches generated by the user. Based on a user's acceptance and/or rejection of search results, the program code can update the data structure. Thus, the first server 510 can include a machine learning process that continuously tunes the data structure relevant to the user. In some embodiments of the present invention, rather than customize a data structure to a user, the program code generates a data structure to reflect the context of the client 530. Thus, users utilizing a common client 530 will execute searches with the same context.

In some embodiments of the present invention, a client 530 executing on one or more computing devices and accessible to a user generates a search interface configured to accept attributes of the data structure in a search executed by the user (e.g., FIG. 4, 420). In executing a search, the program code of the client 530 interfaces with the first server 510 to access the data structure, and obtain context to embed in the query executed through the interface. From the data structure stored at the first server 510, the program code of the client 530 learns culture contexts of the user (e.g., native language(s), native language of locale, current geo-location, geo-locations in which the user has expressed interest, predicted searching purpose (e.g., determined utilizing a neural network), and/or active and/or running applications utilized by the user). The program code transmits a query with embedded cultural context data (from the data structure) to the second server 520. Responsive to the query, the program code obtains the search results, translates the search results into a native language of the user, and returns the results to a user, in the interface (e.g., FIG. 4, 480). Based on the search results, the program code of the client 530, based on user feedback, can provide feedback to the first server 510 that the program code of the first server 510 can utilize in updating the data structure. In some embodiments of the present invention, the program code of the client 530 calls one or more functions executing on the first server 510 to enable this program code to obtain data to generate the data structure, based on the user's utilization of the client 530, the computing node executing the client 530, and/or computing devices utilized by the user that are communicatively coupled to the client 530. For example, with the permission of the user, the program code can track the user searching contexts and utilize this data to update the data structure.

In some embodiments of the present invention, the second server 520 obtains a query with embedded context from the client 530. The program code of the second server 520 extracts the context from the query (e.g., FIG. 4, 440). Based on the query with embedded data, the program code of the second server 520 determines target languages for the query (e.g., FIG. 4, 450). The program code translates the query into multiple targeted languages, preserving the context of the query (e.g., FIG. 4, 460). The program code searches in the targeted languages utilizing the context, including but not limited to a targeted geo-location (e.g., FIG. 4, 470). The program code obtains the search results, translates the search results into a native language of the user, and returns the results to the client 530 (e.g., FIG. 4, 480). In some embodiments of the present invention, the program code of the second server 520 provides a management interface for configuring the program code performing searches with the context and the translations. Elements configured by the program code can comprise a service profile which includes configuration settings including, but not limited to, a machine translation server port, a URL, a number of supported languages, IP addresses of search engines to access when executing a query.

Figure 6:
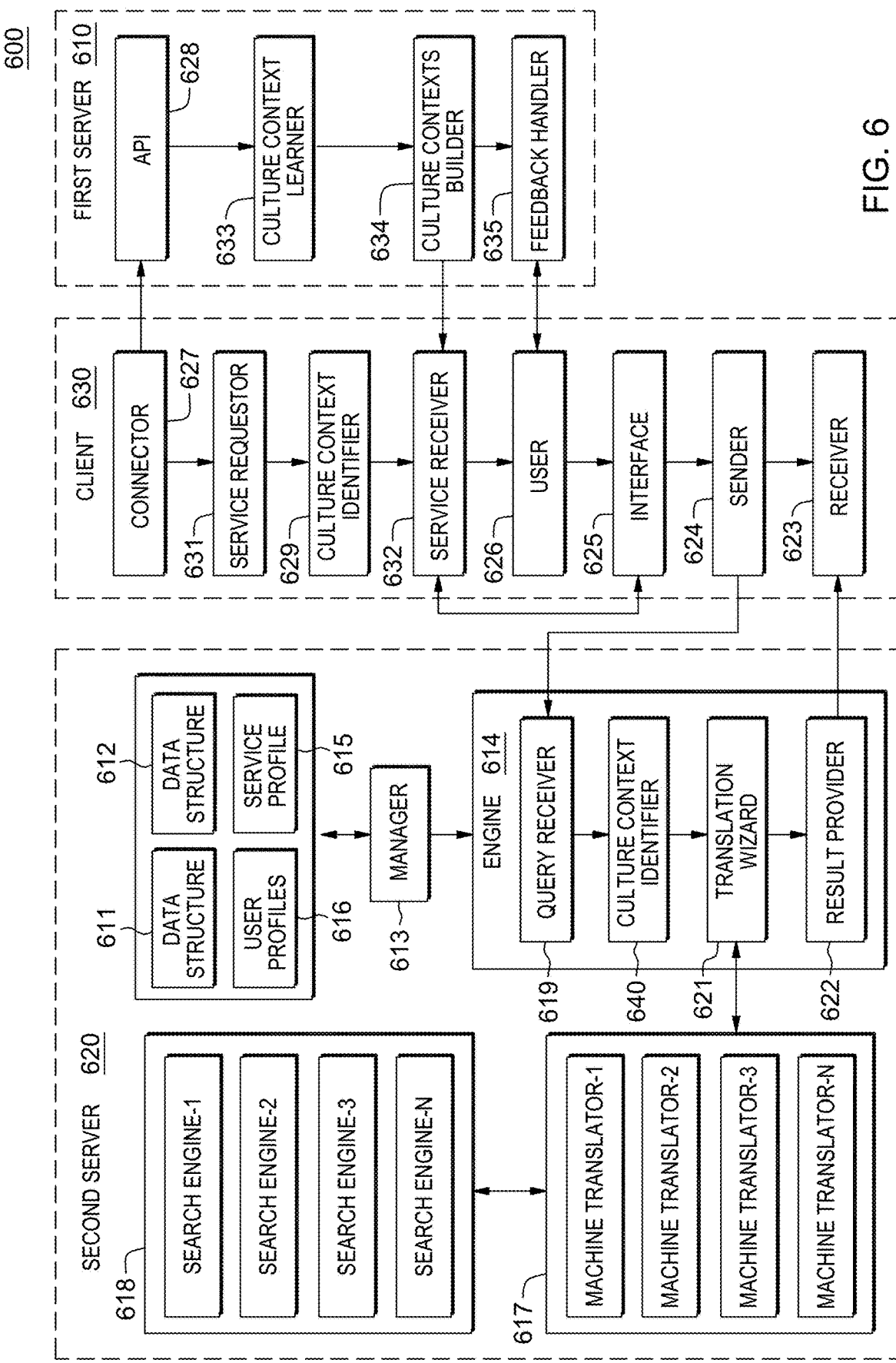
FIG. 6 is an overview of a technical architecture and workflow into which various aspects of some embodiments of the present invention can be implemented.

FIG. 6 is a diagram and workflow 600 of various aspects of some embodiments of the present invention. Just as in FIG. 5, for ease of understanding, various elements are separated into a first server 610, a second server 620, and a client 630. Program code of the second server 620 managed a data structure 611 that the program code utilizes to pass a searching query embedded with cultural context data. In some embodiments of the present invention, this data structure 611 includes a buffer for queried information and a user's contextual data. Another data structure 612 holds contextual data (cultural context) which the program code embeds in the initial data structure 611 in order to include this context in the query. The second data structure can include, but is not limited to a user tag, a native language tag, a location tag, and/or searching context information. The data structures 611 612 are managed by a manager program 613 executing on the second server 620. The manager 613 is a user interface for configuring operation aspects of the context-inclusive searching. For example, an administrative user can utilize the manager 613 to configure aspects of an engine 614 that controls various aspects of the query execution. An administrative user can utilize this interface to configure various services and change and update user personal characteristics.

In some embodiments of the present invention, a manager application 613 also maintains and manages both a service profile 615 and one or more user profile 616. The service profile 615 is one or more files that include universal service configuration settings for utilization in executing searches, including but not limited to, machine translation server port, URL, number of supported languages, IP addresses of search engines, etc. A user profile 616, in contrast, is one or more files that include personal service configuration settings for use in searching, including but not limited to, enabled and/or disables services for data collection, personal information, native languages, locales, etc.

As discussed above, program code of the second server 620, depicted in FIG. 6 as the engine 614, receives a query embedded with the cultural context from a client 610 (e.g., via a query receiver 619), identifies the embedded cultural context (e.g., via the cultural context identifier 640) including but not limited to, user culture, native language, current geo-location, targeted languages, targeted geo-locations etc., and executes the query by translating the query via one or more machine translation engine 617, (sending and receiving the query through a translation wizard 621) to execute the translated query (with the context), in one or more search engines 618. The translation wizard 621 obtains the query results and the program code provides the results 622 to the client 610, via a receiver 623. In advance of the second server 620 receiving the query, a user 626 enters the query in an interface 625, and send the query 624 to the query receiver 619 of the second server 620. In some embodiments of the present invention the engine 614 is a web server or SaaS API for support a searching with embedded context service and translation.

In embodiments of the present invention, the translation wizard 621 includes one or more modules for translating search queries into multiple targeted languages. For example, if the program code determined that a user native language is Simplified Chinese, but the user is located in Austin, Tex., then the translation wizard 621 translates a query (Q1) into English (Q1*en*) and Spanish languages (Q1*es*) and then sends the translated queries (Q1*en* and Q1*es*) to an English search engine and a Spanish search engines, respectively. After receiving the searched results (English results, R1*en* and R2*es*), the program code sends the results the translation machines 617, where the program code translates the results into Chinese (R1*cn* and R2*cn*). As pictured in FIG. 6, the program code can utilize multiple searching engines 618 for searching the translated queries with the targeted geo-locations. Additionally, the program code can also utilize multiple machine translation servers 617 for translating the returned search results from the targeted language to the user's native language.

In order to generate a query with context, program code executing on the client 630 connects 627, based on a service request 631, to an API 628 on the first server 610 to obtain (cultural) contextual information about the user from the data structure 612, in real-time, and/or to generate the data structure 612. In some embodiments of the present invention, the API 626 is a web application for SaaS API for monitoring (with the user permission) the client 630. The program code calls the first server 610 and enables the program code of the first server 610 to learn the cultural context attributes of the user (e.g., major native language and locale, current geo-location, interested geo-locations, predicted search purpose(s), active and/or running application). The program code can request a service 631. The program code obtains the cultural context attributes via a service receiver 632. The program code of the first server 610 learns the context utilizing programs depicted in FIG. 6 as a cultural context learner 633. The program code of the cultural context learner learns the client's and/or the user's culture context (e.g., major native language and locale, current geo-location, interested geo-locations, predicted searching purpose, active and/or running applications). Program code called a builder 634 generates the data structure 612 to house this context and updates the structure, in real-time, or at set intervals. The program code improves the data structure based on receiving, via a feedback handler 635, feedback from the clients to adjusting the service.

Embodiments of the present invention include a computer-implemented method, a computer program product, and a computer system, where program code obtains permission from a user, via an interface of a computing device, to monitor computing activities performed by a user, via a client, based on the client connecting, over a network, to one or more applications. Based on obtaining the permission, the program code monitors the computing activities. The program code analyzes the computing activities performed by the user, in the one or more applications, to identify data comprising elements relevant to the user and relationships between the elements and the user. The program code generates, based on the analyzing, a data structure, where the data structure comprises the data. The program code generates, based identifying the elements in the data structure, a search interface for obtaining entries via the client in a first language, where the first language comprises a native language of the user, to perform a query, where the entries comprise search parameters defining the query, and where the search parameters defining the query are embedded with a portion of the elements. The program code obtains, via the search interface, an entry in the first language, the entry comprising search parameters embedded with the portion of the elements. The program code extracts the portion of the elements from the entry, where the portion of the elements comprise a cultural context for the entry. The program code determines, based on extracting, from the entry, the portion of the elements, one or more target languages for data responsive to the query, where the one or more target languages are not the first language. The program code translates the search parameters and the cultural context into the one or more target languages. The program code executes one or more searches on one or more databases, where the one or more searches comprises the translated search parameters and the translated cultural context.

In some embodiments of the present invention, the program code obtains results of the one or more searches in the one or more target languages. The program code translates the search results into the first language. The program code populates the search interface with the translated search results.

In some embodiments of the present invention, the elements comprise the native language of the user and a geo-location of the user.

In some embodiments of the present invention, the program code determining, by the one or more target languages comprises the program code utilizing the geo-location of the user to identify one or more languages local to the geo-location as the one or more target languages.

In some embodiments of the present invention, the elements are selected from the group consisting of: user culture, native language, current geo-location, targeted language, and targeted geo-location.

In some embodiments of the present invention, the one or more searches comprise a plurality of searches.

In some embodiments of the present invention, the one or more applications comprise a social media site and the elements comprise attributes of a profile of the user on the social media site.

In some embodiments of the present invention, the program code requests, via the search interface, feedback regarding quality of the translated search results. The program code can obtain, via the search interface, responsive to the request, feedback regarding the quality of the translated search results. The program code can then determine if the feedback is consistent with the data structure. Based on determining that the feedback is inconsistent with the data structure, the program code can update the data structure.

In some embodiments of the present invention, the one or more applications comprise a digital wardrobe of the user.

In some embodiments of the present invention, the search interface for obtaining entries via the client in the first language comprises a buffer to hold the portion of the elements.

Referring now to FIG. 7, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the first server 510 610, the second server 520 630, and the client 530 630 can each be understood as a cloud computing node 10 (FIG. 7) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
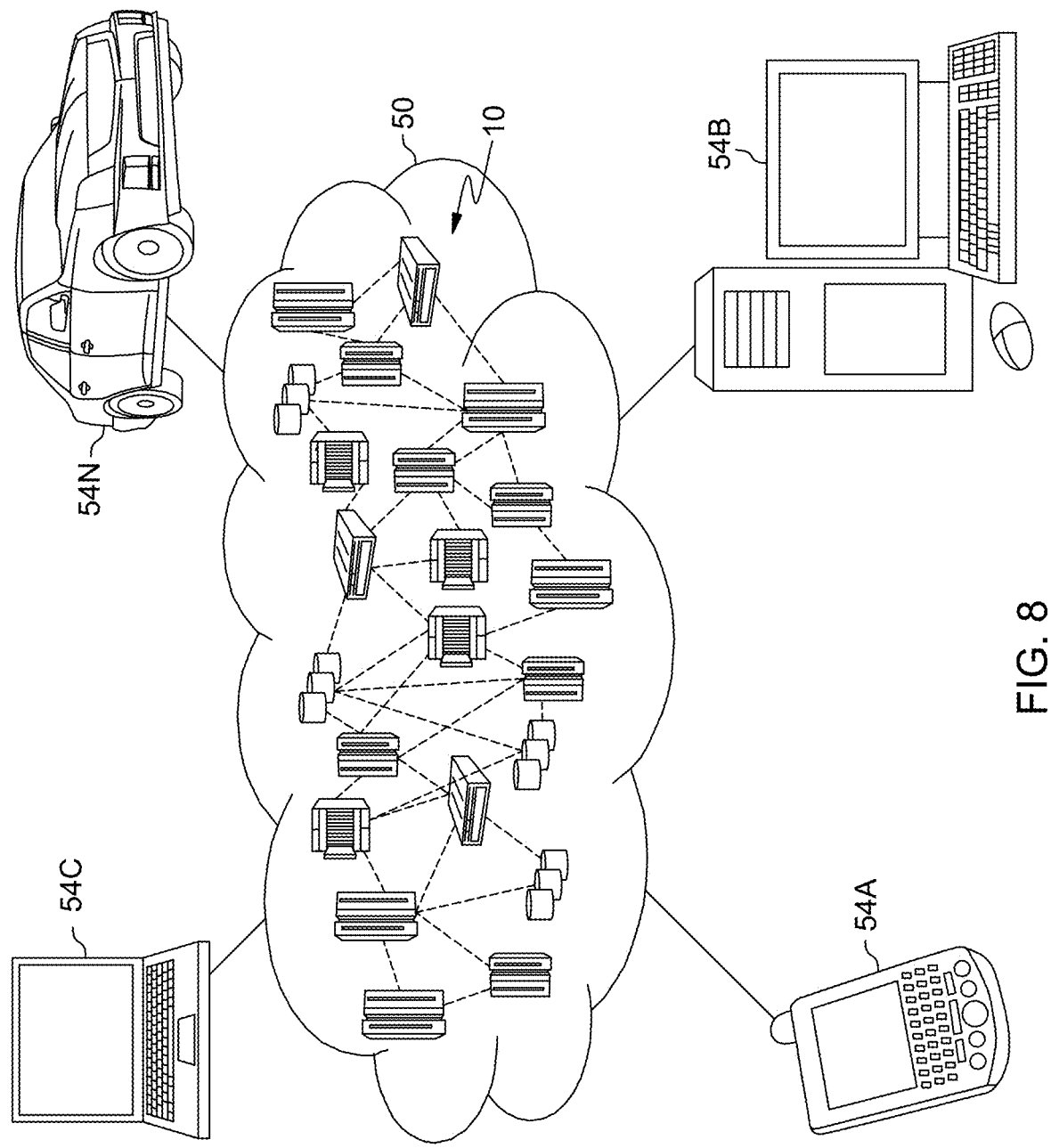
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
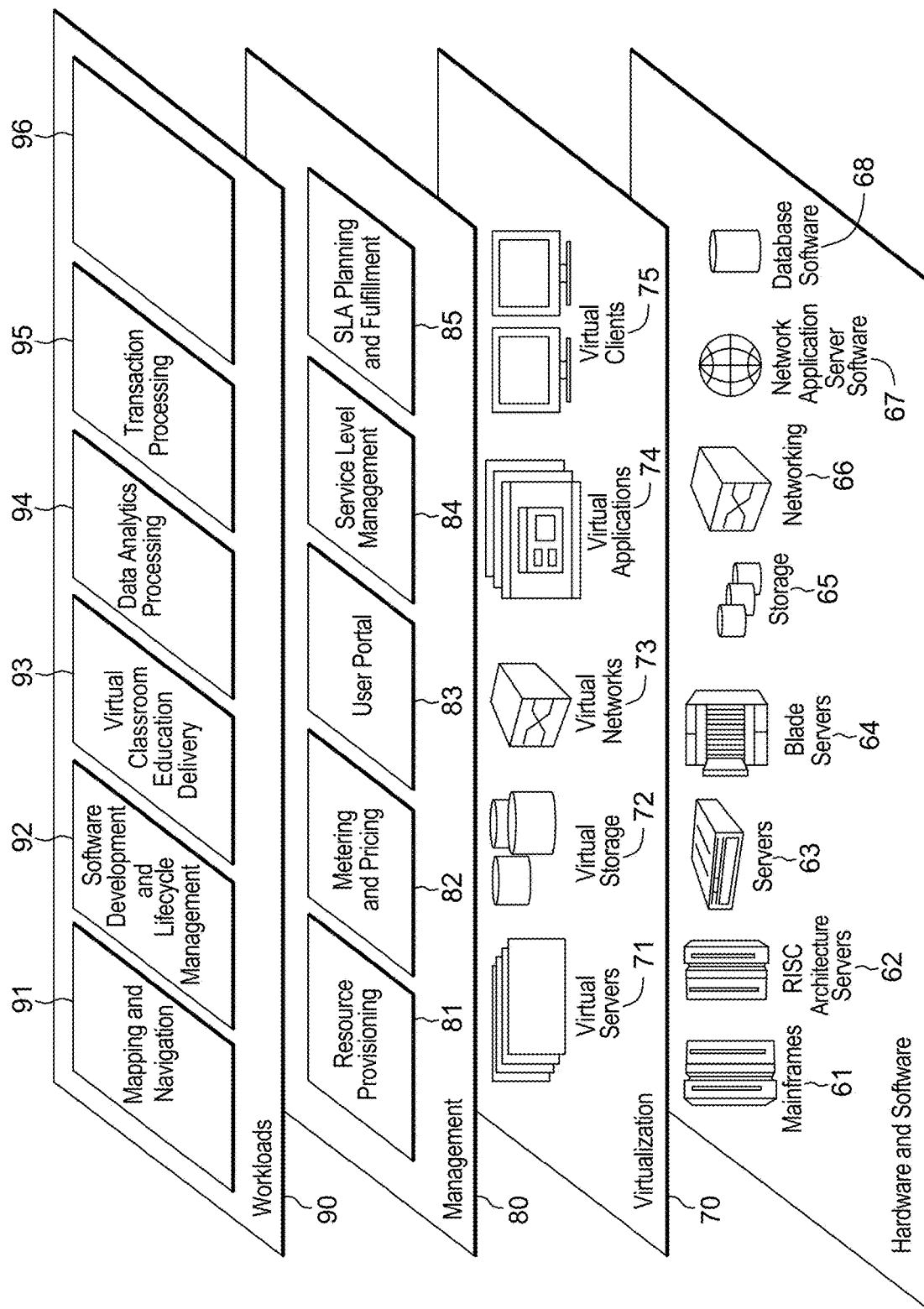
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and executing a translated search with an embedded context to produce contextually correct results 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   executing, by one or more processors, a machine learning process to continuously tune a data structure, wherein the data structure comprises elements utilized to contextualize search queries, the executing comprising:
   continuously monitoring, by the one or more processors, via a user authorized application executing on the client as a service, computing activities performed by a user, via the client, based on the client connecting, over a network, to one or more applications;
   analyzing, by the one or more processors, the computing activities performed by the user, in the one or more applications, to identify data comprising elements relevant to the user and relationships between the elements and the user, wherein the one or more applications comprise at least one application utilized by the user on the client and at least one application or interface executed on one or more other computing devices communicatively coupled to the one or more processors, wherein the one or more applications are active or running applications initiated by the user, wherein the analyzing comprises accessing language settings on the at least one application utilized on the client and determining input languages in the at least one application or interface executed on the one or more other computing devices;
   generating and continuously tuning, by the one or more processors, based on the analyzing, the data structure, wherein the data structure comprises the data;
   generating, by the one or more processors, based on identifying the elements in the data structure, a search interface for obtaining entries via the client in a first language, wherein the first language comprises a native language of the user, to perform a query, wherein the entries comprise search parameters defining the query, wherein the search parameters defining the query are automatically embedded, by the one or more processors, with a portion of the elements, and wherein the search interface for obtaining entries via the client in the first language comprises a buffer to hold the portion of the elements;
   obtaining, via the search interface, via user inputs into the interface, an entry comprising search parameters in the first language;
   based on obtaining the entry, automatically embedding, by the one or more processors, the portion of the elements from the data structure in the entry;
   extracting, by the one or more processors, the portion of the elements from the entry, wherein the portion of the elements comprise a cultural context for the entry;
   determining, by the one or more processors, based on extracting, from the entry, the portion of the elements, one or more target languages for data responsive to the query, wherein the one or more target languages are not the first language;
   translating, by the one or more processors, the search parameters and the cultural context into the one or more target languages; and
   executing, by the one or more processors, one or more searches on one or more databases, wherein the one or more searches comprises the translated search parameters and the translated cultural context, wherein executing the one or more searches on the one or more databases comprises:
   identifying, by the one or more processors, settings governing the executing, wherein identifying the settings comprises:
   accessing, by the one or more processors, a service profile and a user profile, wherein the service profile comprises one or more files comprising universal service configuration settings for utilization in executing the one or more searches, and the user profile comprises user-specific enabled services for data collection and user-specific disabled services for data collection and personal information about the user, wherein the one or more universal configuration settings are selected from the group consisting of: machine translation server ports, universal resource locators, numbers of supported languages, and internet protocol addresses of search engines; and
   executing, by the one or more processors, the one or more searches in accordance with the identified universal service configuration settings, the user-specific enabled services for data collection, the user-specific disabled services for data collection, and the personal information about the user.

2. The computer-implemented method of claim 1, further comprising:
obtaining, by the one or more processors, results of the one or more searches in the one or more target languages;
translating, by the one or more processors, the search results into the first language; and
populating, by the one or more processors, the search interface with the translated search results.

3. The computer-implemented method of claim 1, wherein the elements comprise the native language of the user and a geo-location of the user.

4. The computer-implemented method of claim 2, wherein determining the one or more target languages comprises utilizing the geo-location of the user to identify one or more languages local to the geo-location as the one or more target languages.

5. The computer implemented method of claim 1, wherein the elements are selected from the group consisting of: user culture, native language, current geo-location, targeted language, and targeted geo-location.

6. The computer-implemented method of claim 1, wherein the one or more searches comprise a plurality of searches.

7. The computer-implemented method of claim 1, wherein the one or more applications further comprise a social media site and the elements comprise attributes of a profile of the user on the social media site.

8. The computer-implemented method of claim 2, further comprising:
requesting, by the one or more processors, via the search interface, feedback regarding quality of the translated search results;
obtaining, by the one or more processors, via the search interface, responsive to the requesting, feedback regarding the quality of the translated search results;
determining, by the one or more processors, if the feedback is consistent with the data structure; and
based on determining that the feedback is inconsistent with the data structure, updating, by the one or more processors, the data structure.

9. The computer implemented method of claim 1, wherein the one or more applications further comprise a digital wardrobe of the user.

10. A computer program product comprising:
a computer readable storage medium readable by one or more processors and storing instructions for execution by the one or more processors for performing a method comprising:
executing, by the one or more processors, a machine learning process to continuously tune a data structure, wherein the data structure comprises elements utilized to contextualize search queries, the executing comprising:
continuously monitoring, by the one or more processors, via a user authorized application executing on the client as a service, computing activities performed by a user, via the client, based on the client connecting, over a network, to one or more applications;
analyzing, by the one or more processors, the computing activities performed by the user, in the one or more applications, to identify data comprising elements relevant to the user and relationships between the elements and the user, wherein the one or more applications comprise at least one application utilized by the user on the client and at least one application or interface executed on one or more other computing devices communicatively coupled to the one or more processors, wherein the one or more applications are active or running applications initiated by the user, wherein the analyzing comprises accessing language settings on the at least one application utilized on the client and determining input languages in the at least one application or interface executed on the one or more other computing devices;
generating and continuously tuning, by the one or more processors, based on the analyzing, the data structure, wherein the data structure comprises the data;
generating, by the one or more processors, based on identifying the elements in the data structure, a search interface for obtaining entries via the client in a first language, wherein the first language comprises a native language of the user, to perform a query, wherein the entries comprise search parameters defining the query, wherein the search parameters defining the query are automatically embedded, by the one or more processors, with a portion of the elements, and wherein the search interface for obtaining entries via the client in the first language comprises a buffer to hold the portion of the elements;
obtaining, via the search interface, via user inputs into the interface, an entry comprising search parameters in the first language;
based on obtaining the entry, automatically embedding, by the one or more processors, the portion of the elements from the data structure in the entry;
extracting, by the one or more processors, the portion of the elements from the entry, wherein the portion of the elements comprise a cultural context for the entry;
determining, by the one or more processors, based on extracting, from the entry, the portion of the elements, one or more target languages for data responsive to the query, wherein the one or more target languages are not the first language;
translating, by the one or more processors, the search parameters and the cultural context into the one or more target languages; and
executing, by the one or more processors, one or more searches on one or more databases, wherein the one or more searches comprises the translated search parameters and the translated cultural context, wherein executing the one or more searches on the one or more databases comprises:
identifying, by the one or more processors, settings governing the executing, wherein identifying the settings comprises:
accessing, by the one or more processors, a service profile and a user profile, wherein the service profile comprises one or more files comprising universal service configuration settings for utilization in executing the one or more searches, and the user profile comprises user- specific enabled services for data collection and user-specific disabled services for data collection and personal information about the user, wherein the one or more universal configuration settings are selected from the group consisting of: machine translation server ports, universal resource locators, numbers of supported languages, and internet protocol addresses of search engines; and executing, by the one or more processors, the one or more searches in accordance with the identified universal service configuration settings, the user-specific enabled services for data collection, the user-specific disabled services for data collection, and the personal information about the user.

11. The computer program product of claim 10, the method further comprising:

obtaining, by the one or more processors, results of the one or more searches in the one or more target languages;

translating, by the one or more processors, the search results into the first language; and populating, by the one or more processors, the search interface with the translated search results.

12. The computer program product of claim 10, wherein the elements comprise the native language of the user and a geo-location of the user.

13. The computer program product of claim 11, wherein determining, by the one or more target languages comprises utilizing the geo-location of the user to identify one or more languages local to the geo-location as the one or more target languages.

14. The computer program product of claim 10, wherein the elements are selected from the group consisting of: user culture, native language, current geo-location, targeted language, and targeted geo-location.

15. The computer program product of claim 10, wherein the one or more searches comprise a plurality of searches.

16. The computer program product of claim 10, wherein the one or more applications comprise a social media site and the elements comprise attributes of a profile of the user on the social media site.

17. A system comprising:

a memory;

one or more processors in communication with the memory;

program instructions executable by the one or more processors via the memory to perform a method, the method comprising:

executing, by the one or more processors, a machine learning process to continuously tune a data structure, wherein the data structure comprises elements utilized to contextualize search queries, the executing comprising:

monitoring, by the one or more processors, computing activities performed by a user, via a client, based on the client connecting, over a network, to one or more applications;

analyzing, by the one or more processors, the computing activities performed by the user, in the one or more applications, to identify data comprising elements relevant to the user and relationships between the elements and the user, wherein the one or more applications comprise at least one application utilized by the user on the client and at least one application or interface executed on one or more other computing devices communicatively coupled to the one or more processors, wherein the analyzing comprises accessing language settings on the at least one application utilized on the client and determining input languages in the at least one application or interface executed on the one or more other computing devices;

generating and continuously tuning, by the one or more processors, based on the analyzing, the data structure, wherein the data structure comprises the data;

generating, by the one or more processors, based on identifying the elements in the data structure, a search interface for obtaining entries via the client in a first language, wherein the first language comprises a native language of the user, to perform a query, wherein the entries comprise search parameters defining the query, wherein the search parameters defining the query are automatically embedded, by the one or more processors, with a portion of the elements, and wherein the search interface for obtaining entries via the client in the first language comprises a buffer to hold the portion of the elements;

obtaining, via the search interface, via user inputs into the interface, an entry comprising search parameters in the first language;

based on obtaining the entry, automatically embedding, by the one or more processors, the portion of the elements from the data structure in the entry;

extracting, by the one or more processors, the portion of the elements from the entry, wherein the portion of the elements comprise a cultural context for the entry;

determining, by the one or more processors, based on extracting, from the entry, the portion of the elements, one or more target languages for data responsive to the query, wherein the one or more target languages are not the first language;

translating, by the one or more processors, the search parameters and the cultural context into the one or more target languages; and executing, by the one or more processors, one or more searches on one or more databases, wherein the one or more searches comprises the translated search parameters and the translated cultural context, wherein executing the one or more searches on the one or more databases comprises:

identifying, by the one or more processors, settings governing the executing, wherein identifying the settings comprises:

accessing, by the one or more processors, a service profile and a user profile, wherein the service profile comprises one or more files comprising universal service configuration settings for utilization in executing the one or more searches, and the user profile comprises user-specific enabled services for data collection and user-specific disabled services for data collection and personal information about the user, wherein the one or more files comprising the service profile comprise service configuration settings selected from the group consisting of:

machine translation server ports, universal resource locators, numbers of supported languages, and internet protocol addresses of search engines, and wherein; and executing, by the one or more processors, the one or more searches in accordance with the identified universal service configuration settings, the user-specific enabled services for data collection, the user-specific disabled services for data collection, and the personal information about the user.

18. The computer system of claim 17, the method further comprising:

obtaining, by the one or more processors, results of the one or more searches in the one or more target languages;
translating, by the one or more processors, the search results into the first language; and
populating, by the one or more processors, the search interface with the translated search results.

* * * * *